United States Patent [19]

Gottfried et al.

[11] Patent Number: 4,659,555
[45] Date of Patent: Apr. 21, 1987

[54] PROCESS FOR THE PREPARATION OF BASIC COPPER CARBONATE

[75] Inventors: Werner Gottfried, Altlussheim; Ernst Mack; Lothar Witzke, both of Brühl, all of Fed. Rep. of Germany

[73] Assignee: Th. Goldschmidt AG, Essen, Fed. Rep. of Germany

[21] Appl. No.: 727,861

[22] Filed: Apr. 26, 1985

[30] Foreign Application Priority Data

May 12, 1984 [DE] Fed. Rep. of Germany ....... 3417629

[51] Int. Cl.$^4$ ............................................. C01G 3/00
[52] U.S. Cl. .................... 423/419 R; 423/35; 423/42; 423/429; 423/604; 423/DIG. 1; 423/DIG. 2; 75/117; 204/106
[58] Field of Search ............... 423/35, 419 R, 604, 423/DIG. 1, 42, DIG. 2, 429; 75/117; 204/106

[56] References Cited

U.S. PATENT DOCUMENTS

| | | | |
|---|---|---|---|
| 956,763 | 2/1906 | Gates et al. | 423/35 |
| 1,011,562 | 12/1911 | Bradley | 423/35 |
| 1,111,874 | 9/1914 | Vadner | 423/35 |
| 3,931,007 | 1/1976 | Sugano et al. | 423/DIG. 1 |
| 4,107,082 | 8/1978 | Fremont | 402/174 |
| 4,143,231 | 3/1979 | Fremont | 568/855 |
| 4,303,704 | 12/1981 | Courduvelis et al. | 423/24 |

FOREIGN PATENT DOCUMENTS 2775 of 1926 Australia ................................. 423/35

OTHER PUBLICATIONS

Mellor, Joseph William, *A Comprehensive Treatise on Inorganic and Theoretical Chemistry*, vol. III, 1946, pp. 267–280.
Hodgman, Charles D., *Handbook of Chemistry and Physics*, 43rd ed. (1962) Student Ed, p. 172.
Derwent publication of NL7309-042 cited as 12724v/07 to Sherwin Williams Co.

Primary Examiner—John Doll
Assistant Examiner—Robert L. Stoll
Attorney, Agent, or Firm—Toren, McGeady and Goldberg

[57] ABSTRACT

The invention relates to a process for the preparation of basic copper carbonate by reacting copper salts with alkali carbonate in aqueous solution at elevated temperatures and with stirring and subsequently isolating the copper carbonate. In this process, a waste solution from copper etching processes which contains hydrochloric acid and sodium chloride, is stirred into a 5 to 15 weight percent solution of alkali carbonate heated to 40° to 70° C., the pH of the solution not being allowed to fall below 6.5, and the precipitated basic copper carbonate is separated from the aqueous solution in a known manner. A light green, basic copper carbonate is obtained, which is free of copper chloride and copper oxide.

6 Claims, No Drawings

PROCESS FOR THE PREPARATION OF BASIC COPPER CARBONATE

BACKGROUND OF THE INVENTION

1. Field of the Invention

The invention relates to a process for the preparation of basic copper carbonate in which the hydrochloric acid and sodium containing waste solution from copper etching processes is stirred at an elevated temperature into an aqueous alkali carbonate solution and the basic copper carbonate is subsequently separated from the solution.

2. Description of the Prior Art

Large amounts of waste solutions from copper etching processes are obtained in the production of etched moldings and printed circuits. There is a need to recover the copper from these solutions in the form of economically valuable copper salts, such as, for example, copper carbonate, and to utilize these salts in a meaningful manner. In this connection, it has proven to be particularly difficult to work up waste solutions from copper etching processes which contain hydrochloric acid.

German Offenlegungsschrift No. 23 38 324 discloses a process for recovering copper from, for example, copper(II)-containing solutions in which the copper(II) salts are reacted with aqueous sodium carbonate solutions and basic copper salts are obtained which, in addition to copper carbonate, also contain some copper chloride, copper sulfate and copper oxide.

German Offenlegungsschrift No. 25 08 084 relates to a process for the preparation of agglomerates of bismuth-containing crystalline particles from basic copper carbonate. It mentions, however, a process for the preparation of basic copper carbonate, in which hydrated copper carbonate is precipitated by simultaneously feeding in the copper salt solution and the neutralizing alkali carbonate while stirring and maintaining the pH between 5 and 8. In a second step, the reaction mixture is converted at temperatures of at least 60° C. into basic copper carbonate. Apart from the fact that very pure copper salt solutions are used in this process, the purpose of the process is to prepare a crystalline, bismuth-containing copper carbonate for use in the preparation of a copper(I) acetylide complex that can be used as an ethinylizing catalyst. From a chemical engineering standpoint, controlling the simultaneous feeding of reactants is very expensive.

Precipitation processes for copper(II) salts, especially for copper(II) chloride, with sodium carbonate solutions are described in the journal, Izv. Khim 12 (1979), pages 524 to 533. These processes lead to results which are similar to the precipitation processes with copper(II) salts and alkali solutions. According to this publication, gelatinous precipitates of the copper hydroxide type are obtained, when the precipitation is carried out with dilute copper(II) chloride solutions and, according to the data presented there, basic crystalline copper(II) chloride is precipitated when concentrated copper(II) solutions are used.

SUMMARY OF THE INVENTION

We have discovered an economic and simple process for the utilization of the aforementioned waste solutions from copper etching processes by means of which a basic copper carbonate is obtained, which is as free as possible of copper oxide and copper chloride.

This is accomplished according to the invention by stirring the waste solution from the copper etching process into a 5 to 15 weight percent alkali carbonate solution heated to 40° to 70° C., and not allowing the pH of the solution to fall below 6.5.

By adhering to the inventive process conditions, a pure, light green, basic copper carbonate is obtained which corresponds to the formula $CuCO_3.Cu(OH)_2.xH_2O$ (x being less than 1). It is essential that the pH does not fall below 6.5. Only by so doing can it be assured that a pure, light green copper carbonate is obtained. When carrying out the process, the reaction mixture, at the start of the addition of the waste solution from copper etching processes to the alkali carbonate solution heated to 40° to 70° C., initially turn black and during the course of the process, turns to a brown color. At the end of the reaction, a light green precipitate of basic copper carbonate is then present, which, after the supernatant aqueous solution is decanted off, can be readily and rapidly filtered off.

DESCRIPTION OF THE PREFERRED EMBODIMENT

In a preferred version, the waste solution from the copper etching processes is stirred into an alkali carbonate solution that already contains basic copper carbonate in suspended form. It is advisable to proceed by allowing the precipitated, basic copper carbonate to stand briefly after the end of the reaction, then decant the supernatant aqueous solution, and add fresh alkali carbonate to this precipitated copper carbonate. Waste solution from copper etching processes is then again stirred into this suspension under the aforementioned conditions. This process may, if necessary, be repeated several times.

The purpose of this step of the process is to enlarge the precipitated, crystalline copper carbonate particles. Accordingly, finely to coarsely crystalline copper carbonate particles, ranging in size from 5 to 50 μm, depending on the number of precipitation processes, are formed. At the same time, the bulk density of the subsequently dried material is also increased by this so-called upgrading procedure.

The light green, basic copper carbonate obtained by the inventive process, is practically free of chlorine and contains 56% copper and 26% $CO_3$.

The basic copper carbonate so obtained is particularly suitable as a feed additive and for the preparation of catalysts.

The inventive process is described in greater detail by means of the following examples.

EXAMPLE

A sodium carbonate solution (90 l) containing 146 g $Na_2CO_3$/l was added to a 200 l vessel equipped with stirrer and heated to a temperature of 60° C. While stirring intensively and maintaining this temperature, 44 l of a waste solution from copper etching processes with a density of 1.34 g/cc and containing 21 g/l of HCl, 183 g/l of NaCl and 272 g/l of $CuCl_2$ were added at a steady rate over a period of one hour.

During the addition, the pH which initially was higher than 12, came to a value of 7.7. After the stirrer was turned off, the basic copper carbonate formed deposited within 30 minutes as a light green precipitated sludge. A portion (100 l) of the supernatant, sodiumchloride-containing solution which now contained only 8 mg/l of Cu, was decanted off. A sample (A) was taken from the precipitated sludge, filtered, washed and dried. The properties of this basic copper carbonate obtained after a single precipitation process are listed in the following Table 1.

Sodium carbonate solution was added once again to the remaining aqueous basic copper carbonate suspension and waste solution from copper etching processes was added as described above. Here also, a sample (B) was taken from the precipitated sludge at the end of the reaction after the supernatant solution had been decanted off. This process was repeated an additional three times, and samples C, D, and E were taken after each precipitation process. The properties of Samples B, C, D, and E may also be found in Table 1.

The bulk of the deposited, basic copper carbonate was now filtered off, washed and dried. A total of 51 kg of light green basic copper carbonate was obtained. It contained 55.4 weight percent Cu, 26.1 weight percent $CO_3$, 0.02 weight percent Cl, 0.3 weight percent Na and 0.5 weight percent $H_2O$. This composition corresponds to the formula $CuCO_3 \cdot Cu(OH)_2 \cdot xH_2O$, in which x is less than 0.5.

TABLE 1

| Sample | % Na | % Cl | Sediment Density After 2 hr g/cc | $H_2O$ Content in Sediment wt. % | Bulk Density Dry g/cc | Average Particle Size μm |
| --- | --- | --- | --- | --- | --- | --- |
| A | 0.32 | 0.028 | 1.31 | 65 | 0.6 | 7 |
| B | 0.30 | 0.021 | 1.54 | 50 | 0.95 | 10 |
| C | 0.28 | 0.019 | 1.73 | 41 | 1.2 | 17 |
| D | 0.26 | 0.018 | 1.85 | 35 | 1.4 | 27 |
| E | 0.26 | 0.019 | 1.97 | 30 | 1.5 | 35 |

COMPARISON EXAMPLE (not of the invention)

As in the preceding example, the sodium carbonate solution was filled into the vessel and the waste solution from copper etching processes was added to it. However, the precipitation process was not terminated when the pH reached a value of 6.5, but instead continued until a pH of 5.0 was reached. When pH values of 7, 6.5, 6.0, 5.5 and 5.0 were reached, in each case, the addition of the waste solution from etching processes was interrupted and a sample of the precipitated sludge was taken, washed and analyzed.

It is clearly evident from the values listed in Table 2 that at pH values below 6.5, the product obtained is a copper-oxychloride-containing precipitate and not basic copper carbonate.

TABLE 2

| Sample at pH | Wt. % Cl | Wt. % Na |
| --- | --- | --- |
| 7.0 | 0.023 | 0.25 |
| 6.5 | 0.026 | 0.28 |
| 6.0 | 0.90 | 0.26 |
| 5.5 | 4.4 | 0.22 |
| 5.0 | 8.7 | 0.16 |

We claim:

1. A process for the preparation of basic copper carbonate from a copper etching process waste solution comprising adding the waste solution with stirring into a 5 to 15 weight percent alkali-metal carbonate solution at a temperature of 40° to 70° C., and not allowing the pH of the mixture to fall below 6.5, and subsequently separating the basic copper carbonate from the solution.

2. The process of claim 1 wherein the waste solution is stirred into an alkali carbonate solution which already contains suspended basic copper carbonate.

3. The process of claim 1 wherein the copper carbonate obtained has the formula $CuCO_3 \cdot Cu(OH)_2 \cdot xH_2O$ wherein x is less than 1.

4. The process of claim 2 wherein the copper carbonate obtained has the formula $CuCO_3 \cdot Cu(OH)_2 \cdot xH_2O$ wherein x is less than 1.

5. The process of claim 3 wherein the copper carbonate formed has a particle size from 5 to 50 μm.

6. The process of claim 4 wherein the copper carbonate formed has a particle size from 5 to 50 μm.

* * * * *